(12) United States Patent
Rebello

(10) Patent No.: US 7,574,197 B1
(45) Date of Patent: Aug. 11, 2009

(54) COMMUNICATION DEVICE

(75) Inventor: Euphrason Rebello, Toronto (CA)

(73) Assignee: Nokia Corporation, Espoo (FI)

( * ) Notice: Subject to any disclaimer, the term of this patent is extended or adjusted under 35 U.S.C. 154(b) by 1278 days.

(21) Appl. No.: 09/712,914

(22) Filed: Nov. 16, 2000

Related U.S. Application Data

(63) Continuation of application No. PCT/GB99/03083, filed on Sep. 13, 1999.

(51) Int. Cl.
*H04M 1/66* (2006.01)
*H04M 1/68* (2006.01)
*H04M 3/16* (2006.01)

(52) U.S. Cl. ............ 455/410; 455/411; 455/418

(58) Field of Classification Search ...... 455/410–412.2, 455/414.1, 415, 418–420, 435.1, 435.2, 432.2, 455/432.3, 433, 550.1, 551, 552.1, 565, 558, 455/515, 414, 560; 340/825.44, 825.31, 340/825.34; 380/4, 23, 247–249
See application file for complete search history.

(56) References Cited

U.S. PATENT DOCUMENTS

| | | | | |
|---|---|---|---|---|
| 6,124,799 A | * | 9/2000 | Parker | 340/5.85 |
| 6,141,544 A | * | 10/2000 | Corriveau et al. | 455/411 |
| 6,259,908 B1 | * | 7/2001 | Austin | 455/411 |
| 6,314,283 B1 | * | 11/2001 | Fielden | 455/411 |
| 6,321,079 B1 | * | 11/2001 | Cooper | 455/411 |
| 6,445,914 B1 | * | 9/2002 | Findikli et al. | 455/411 |

* cited by examiner

*Primary Examiner*—Pablo N Tran
(74) *Attorney, Agent, or Firm*—Banner & Witcoff, Ltd.

(57) ABSTRACT

The invention relates to programming subsidized radio telephones with NAM data. The invention provides a subsidy code to allow a user to program the NAM. This code changes once programming is complete in response to an incoming call.

18 Claims, 3 Drawing Sheets

COMMUNICATION DEVICE

This application is a continuation of international application number PCT/GB99/03083, filed 13 Sep. 1999

BACKGROUND OF THE INVENTION

1. Field of the Invention

The invention relates to programming a communication device with identifying information.

2. Description of the Prior Art

Before a communication device, such as a radio telephone bought off-the-shelf, is fully functional it is necessary for the purchaser to sign up with a service provider. Although a telephone is manufactured with a unique Electronic Serial Number ESN, in order to connect to a radio telephone system of the purchasers choice (e.g. AWS or Bell Mobility), the radio telephone must be provided with sufficient information to identify the radio telephone user and the system to which it is connected for calls to be routed to it. This information is provided in the Number Assignment Module (NAM) information.

The NAM information includes a Mobile Identification Number (MIN) and data indicating the service provider chosen. In addition to this information relating to the specific radio telephone and service provider, the NAM includes security data used during registration to confirm the identity of the radio telephone and data providing details of a 'Home Traffic Area' and 'System Control Channels'. The details of the 'System Control Channels' may include information relating to the level of service requested such as an access overload class providing information relating to the relative priority given to calls made by the specific subscriber. The radio telephone uses all this NAM information along with its ESN to gain access to the chosen radio telephone system.

With the increasingly wide use made of radio telephones, the need has arisen for their purchase at outlets other than the traditional dedicated shops. Phones are available for purchase at convenience stores and gas stations. Traditionally, the cost of a handset has been subsidized when the purchaser signs a contract for a period with a particular service provider. Without this subsidy, the cost of a handset is unattractive to the purchaser and in order to encourage customers to buy phones through nondedicated outlets, it is important that there is the potential for the handsets to be available with a subsidy.

A problem arises when the phones are not sold by dedicated sales outlets as it falls on the purchaser to secure a service provider and program the relevant NAM information into the phone. As under these circumstances the programmer is inevitably inexperienced, the procedure needs to be simple but also the service provider subsidizing the cost of the phone needs to be fairly certain that the purchaser is going to take out a contract with them rather than with a rival provider.

It will generally be, the purchaser who programs the phone under the above circumstances. Therefore, the process must be straightforward as the programmer will inevitably be relatively inexperienced.

The NAM is important to the functioning of the phone and the information stored in the NAM must therefore be well protected from inadvertent changes. To prevent the NAM from being changed inadvertently the storage of information at the relevant locations is code protected. It is therefore necessary for the purchaser to know the code in order to be able to program the NAM. This is where a problem arises. If the code is known to the purchaser, the NAM can be programmed with any data including data relating to a system provider other than the provider that subsidized the cost of the phone.

To prevent the customer from being free to choose any service provider when a subsidized phone has been purchased, the code has generally been made specific to a particular phone and retained by the service provider. This is because if a universal code were to be used this would soon be public knowledge and purchasers of subsidized phones would no longer need to sign up with a contract to the subsidizing provider. This would almost inevitably lead to the end of subsidized phones through nondedicated outlets.

SUMMARY OF THE INVENTION

In accordance with the present invention there is provided a communication device addressable with reference to identifying data comprising a processor responsive to a code for controlling the storage of identifying data in the memory locations, the processor being responsive to an incoming signal addressing the device with reference to the stored identification data to change the code for subsequently controlling the storage of identification data in the memory locations.

In accordance with a second aspect of the invention, there is provided a radio telephone for operation in a telecommunications network in which it is addressable using user-specific identification data, the radio telephone comprising a memory for storing user-specific identification data; a processor responsive to a code for controlling storage of the user-specific identification data in the memory and to an incoming message addressing the radio telephone with reference to the stored identification data for changing the code for controlling storage of the user-specific identification data.

In accordance with a third aspect of the invention, there is provided a method of activating a communication device for operation in a telecommunications network, the communications device having a memory for storing user-specific identification data, the method comprising the steps of entering a code to enter a mode for programming the identification data; entering identification data for storage in the memory locations; and changing the code in response to receiving a message addressing the device with reference to the stored identification data.

By having a code for accessing the NAM storage area that changes once the phone has been addressed, the code change is to an extent under the control of the service provider. The provider can end any programming session by making a call to the programmed handset. This will have two advantages, the first is that the service provider can check that the handset has been correctly programmed. The second is that the code can be changed so that a second code is required before the NAM can be reprogrammed.

The second code is advantageously another phone specific code. This second code is then known only to the service provider who can provide the information to the phone purchaser once the terms of the initial contract have been complied with. Once the second code is known to the user, any service provider which can be used as the NAM can be programmed and reprogrammed at will. In this way once the initial period of the contract has expired the user can select a new service provider and is free to change operator.

By changing the code only when the phone has been correctly programmed, the user is able to use the first code to correct any errors in programming. If the code were to be changed immediately, the second code would need to be released if a programming error was made. Of course a third or even more codes could be used to allow corrections to be made but a change of code to a code retained by the service provider in response to an incoming message provides advantages.

The second code may be stored on the phone. In one embodiment the second code may be randomly generated.

BRIEF DESCRIPTION OF THE DRAWINGS

The application will now be described in more detail with reference to Figures of the drawings of which.

DESCRIPTION OF THE PREFERRED EMBODIMENTS

Figure 1:
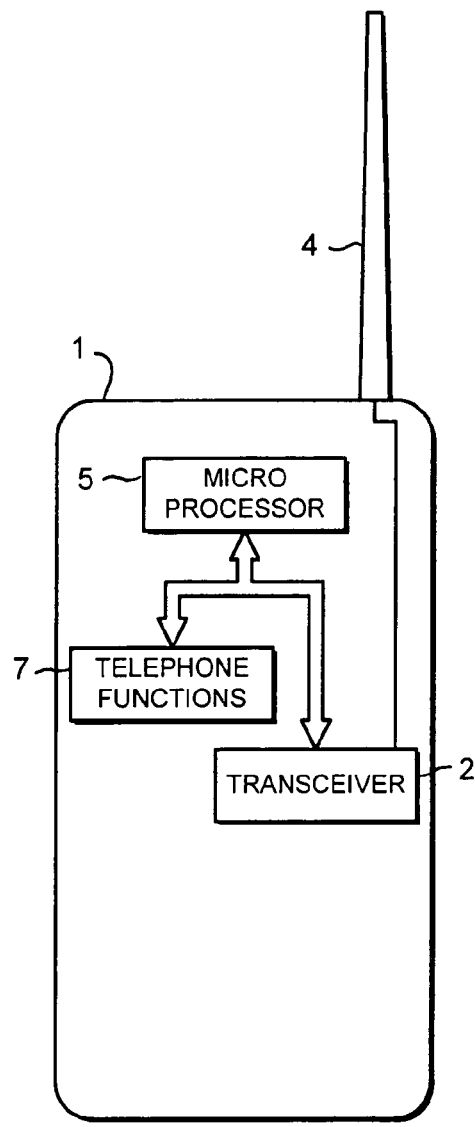
FIG. 1 is a schematic representation of a radio telephone of an embodiment of the present invention.
Figure 2:
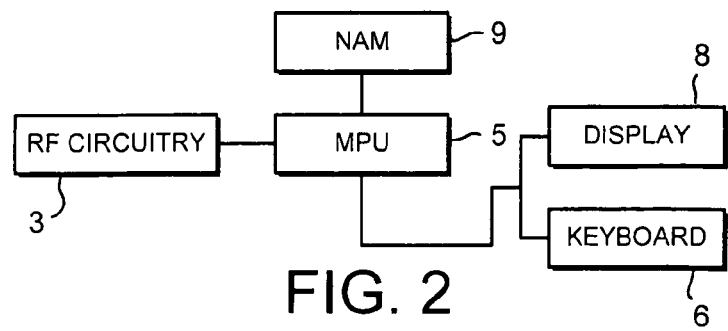
FIG. 2 is a schematic representation of a radio telephone of an embodiment of the present invention.

FIGS. 1 and 2 are schematic representations of a radio telephone 1. As is conventional, the radio telephone 1 includes a transceiver 2 including R.F. circuitry 3 (FIG. 2) connected to an external antenna 4 and coupled to a microprocessor unit (MPU) 5 that receives signals from a keyboard 6, controls telephone functions 7 and displays information on a display 8. The telephone 1 has its own inherent telephone number by virtue of a NAM 9 contained within the main unit of the radio telephone. The NAM contains user-specific information that is programmed into the phone to allow calls to be made and received.

Figure 3:
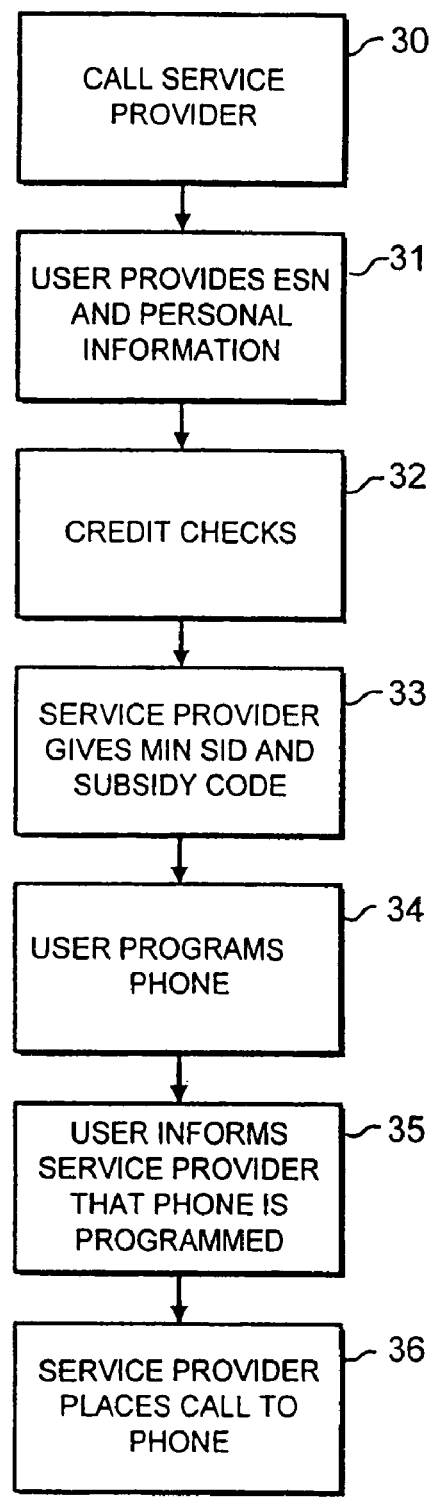
FIG. 3 is a flow chart showing a process for storing identification information in the NAM in accordance with an embodiment of the invention.

FIG. 3 is a schematic showing the process of programming user-specific NAM information into the phone to replace existing data that in this embodiment are factory default settings.

In order to start using a subsidized handset purchased from a retail outlet, for example, the user must contact a service provider. The literature provided with the phone will inform the purchaser of the telephone number of the service provider and probably the programming method. It will NOT give the subsidy code necessary for NAM programming mode to be entered.

The user will power up the telephone (block 30) for the first time and call the service provider. The service provider could, however, be contacted in other ways, for example, via computer. During this call, the purchaser provides the service provider with information (block 31). This will include the ESN of the phone and the personal information necessary for the all important credit checks to be carried out (block 32). Once the service provider is satisfied of the credentials of the purchaser, the customer is provided with the subsidy code, specific to the phone. This code will have been provided to the service provider by the manufacturer of the phone along with the ESN of the particular device and perhaps further authentication data. The customer will also be provided with the user-specific information such as the MIN and SID which needs to be entered in the phone (block 33).

Armed with the subsidy code, and NAM data the user follows the programming instructions that will be provided with the purchased phone (block 34). Preferably, the user performs this programming while still connected to the service provider. Once programming is completed the user informs the service provider that the process is complete (block 35) and the service provider places a call to the now programmed handset (block 36) using the programmed identity.

Figure 4:
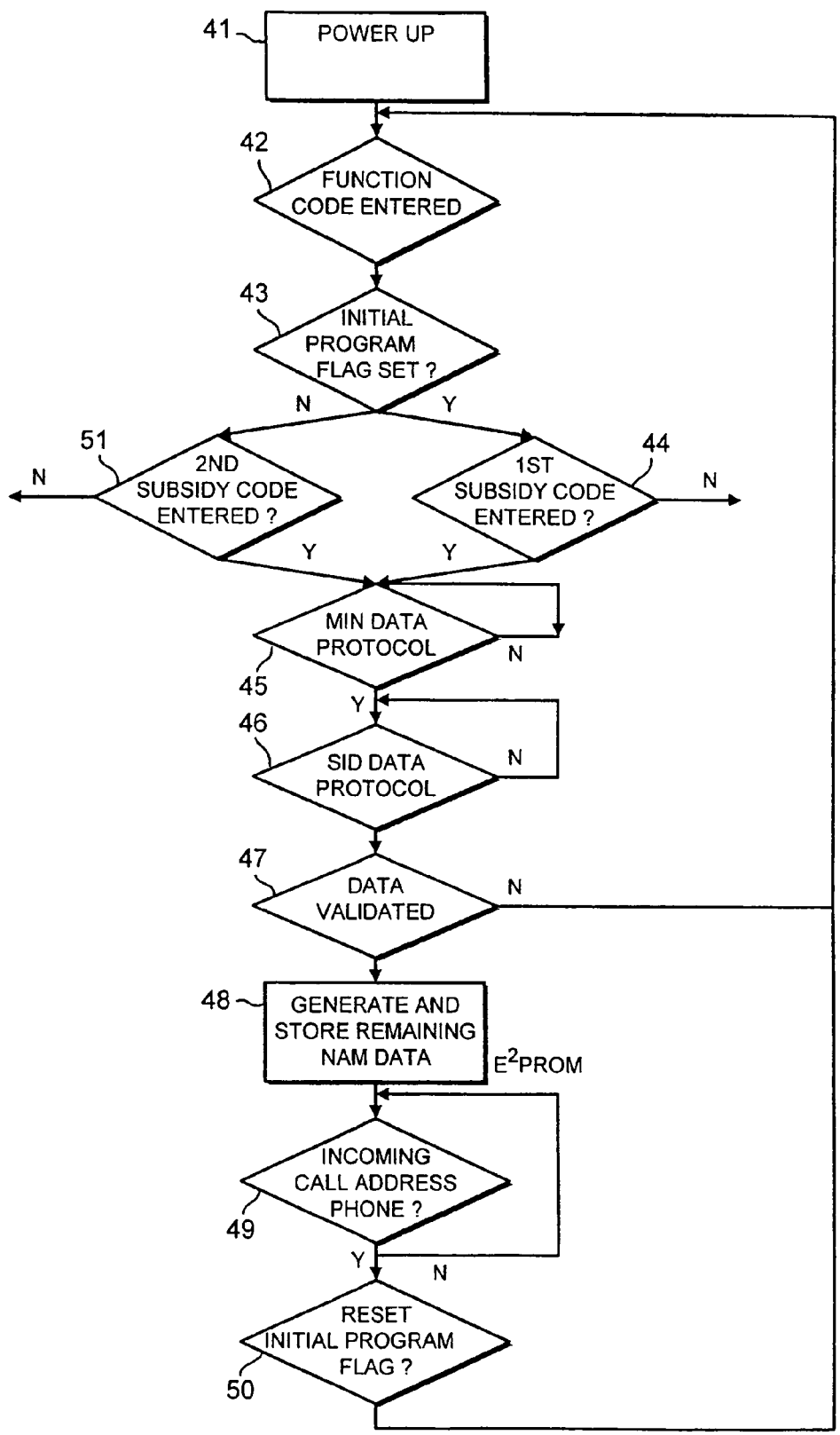
FIG. 4 is a flow chart showing user operation of the radio telephone during the process of FIG. 3.

FIG. 4 is flow chart illustrating in greater detail one embodiment of the invention describing how the data may be input.

To begin NAM programming the phone is powered up, (block 41) and a function code is entered (block 42). In this example the code is *#639#. This would, in an unsubsidized phone be sufficient to enter the NAM programming mode. However, with a subsidized phone the user must follow this with a subsidy code e.g. 1234 and a further #. The initial program flag is checked (block 43). This determines whether the phone is being programmed for the first time or if it is a subsequent reprogramming. The initial program flag in this embodiment determines which subsidy code is required to allow NAM programming. If it is the first time the NAM is being programmed, the first subsidy code is required. If it is a subsequent programming, the second subsidy code will be needed. If the initial programming flag is set, the code entered is compared with the first subsidy code to ensure it is correct and that the next stage of programming can continue (block 44). If the code is correct, the phone prompts the user to enter the telephone number (MIN) and once this has been input press the send key. The MIN should be a 10 digit number. The phone checks that the correct number of digits have been entered (block 45) and if so prompts SID and options? At this point the system ID which is a 5 digit number and any other data necessary is entered. Once the data has been entered the entry is terminated with another press of the send key. If this meets the required protocol, the data is accepted (block 46).

To validate the data, a checksum may be generated from the MIN and SID entered. This checksum can then be verified with the operator over the phone line or, this checksum may have been provided by the operator along with the first subsidy code and the MIN and SID information (block 47).

If the check sum is not confirmed, the user can press the end key and return to normal operation of the phone at which point the NAM programming mode can be re-entered using the function code *#639# and the same subsidy code and the process is repeated.

If the check sum is correct, the remaining NAM information is generated from the MIN and SID (block 48). The information generated may include, for example, the access overload class or the system control channel. This information is to be stored in the NAM along with the MIN and SID entered through the keyboard and possibly other default settings.

The entered NAM data replaces the existing data in the NAM in this embodiment as soon as the checksum verification occurs (block 49). Once the NAM has been programmed with user-specific data, the phone is able to receive a call.

Up to this point the process can be started again if, for instance, an error has been made and the entire programming session started again by entering the NAM programming code *#639# and the subsidy lock provided by the network. This is possible while an 'initial programming flag' is set in the E$^2$PROM.

Provided the data has been entered correctly, the radio telephone should now have its own individual identity and can be used to make and receive calls. It is after this point that the subsidy code of the phone is altered. As it is possible that all the data has not been entered correctly even if a checksum has been used. It is preferable that the subsidy code is not altered until the proper operation of the telephone has been confirmed. This can be done by making sure the phone can receive a call.

As part of the final check the service provider can put a call through to the new user. If the NAM has been correctly programmed the phone will be able to receive and act on signals sent from the network. In this embodiment once the phone has received an alert signal and begun to ring (block 49), the 'initial programming flag' is reset (block 50) and the subsidy code changes to a new value known only to the service provider, the 2nd subsidy code (block 51). The new subsidy code for example 5678 would from then on be necessary in order to enter the NAM programming mode. The second subsidy code could already be stored in the phone although other options such as over the air provision are possible. In addition to a new subsidy code, a new function code could also be necessary to reprogram the NAM.

Messages other than the alert message could be used to reset the flag although the alert signal has the advantage that it not only achieves the network goals in that it changes the subsidy code but it also provides tangible confirmation to the user that the phone is now working.

A non-exclusive list of messages that could be used to reset the flag are:

1. Page (valid phone number required)
2. Voice Channel Allocation (already received a Page)
3. Alert (audible confirmation that phone is active)
4. Maintenance (silent confirmation)
5. Audit (valid phone number required, minimal response from phone)

It is not the particular message that is important rather that the programmed phone is able to identify that it is being addressed and act to reset the flag in response.

Different protocols will have different signals that fulfill the requirements.

Once the NAM has been properly programmed for the first time and the subsidy lock changed, in order to unlock the NAM for reprogramming a second function code may be required as well as the new subsidy code. In an alternative to the present embodiment, the code *#775#5678 could be entered in order for the phone to prompt input of the new NAM data. The processes described with reference to FIG. 4 would then be repeated with the new NAM data.

The second subsidy code could be used to protect a number of different functions that the operator did not want the user to access. It is also possible in embodiments of the invention that the user would still be able to access a subset of the NAM for reprogramming without requiring the second subsidy code. For example, the second subsidy code could be required for the entire NAM to be reprogrammed whereas reprogramming on an existing network could still be possible using the first subsidy code.

The present invention includes any novel feature or combination of features disclosed herein either explicitly or any generalization thereof irrespective of whether or not it relates to the claimed invention or mitigates any or all of the problems addressed.

In view of the foregoing description it will be evident to a person skilled in the art that various modifications may be made within the scope of the invention.

The invention claimed is:

1. An apparatus comprising:
   memory configured to store identification data;
   a processor configured to receive an incoming signal addressing the apparatus with reference to identification data stored in the memory, wherein entry of a first code is required to make any change to the identification data prior to receiving the incoming signal; and
   in response to receiving the incoming signal, the processor is further configured to change the first code to a second code, wherein entry of the second code is required to make any change to the identification data after changing the first code to the second code.

2. An apparatus according to claim 1 wherein the identification data includes data identifying a particular service provider.

3. An apparatus according to claim 1 wherein the apparatus is a radio telephone and the incoming signal addressing the apparatus is a first call received by the apparatus after the apparatus is given a new identity.

4. An apparatus according to claim 1 wherein the apparatus is a phone and the second code is stored in the phone.

5. An apparatus according to claim 1 wherein the second code is specific to the apparatus.

6. An apparatus according to claim 1 wherein the second code is randomly generated.

7. An apparatus according to claim 1 wherein the first code is specific to the apparatus.

8. An apparatus according to claim 1 wherein the first code is randomly generated.

9. An apparatus according to claim 1 wherein the identification data includes mobile identification number (MIN) data.

10. A method comprising:
    receiving an incoming signal addressing a communication device with reference to identification data stored in the memory of the communication device, wherein entry of a first code is required to make any change to the identification data prior to receiving the incoming signal; and
    in response to receiving the incoming signal, changing the first code to a second code, wherein entry of the second code is required for making any change to the identification data after changing the first code to the second code.

11. The method of claim 10, wherein in the incoming signal is received upon confirming the communication device is able to receive a call.

12. The method of claim 10, wherein the second code is known only to a service provider until a predefined time.

13. The method of claim 10, wherein the communication device is a mobile phone and wherein the incoming signal is a first call received by the communication device.

14. The method of claim 13, wherein the first call is configured to confirm correct programming of the communication device.

15. A method comprising:
    receiving, at a device, input corresponding to entry of a code;
    determining whether the code matches a first code required for programming identification data in the device;
    in response to determining that the received code matches the first code required for programming identification data in the device, providing a prompt for entering the identification data;
    receiving, at the device, the identification data;
    confirming correct programming of the device using the identification data; and
    changing the first code to a second code upon confirming correct programming of the device, wherein entry of the second code is required to program the identification data in the device after changing the first code to the second code.

16. The method of claim 15, wherein the first code is a subsidy code and wherein the identification data is number assignment module (NAM).

17. The method of claim 15, further comprising resetting an initial programming flag upon confirming the device has been correctly programmed.

18. The method of claim 15, wherein the first code and the second code are pre-stored on the device.

* * * * *